United States Patent Office 3,094,551
Patented June 18, 1963

3,094,551
PROCESS FOR PREPARING CYANO-ESTERS
Carol K. Sauers, Highland Park, and Robert J. Cotter, New Brunswick, N.J., assignors to Union Carbide Corporation, a corporation of New York
No Drawing. Filed Sept. 4, 1959, Ser. No. 838,041
10 Claims. (Cl. 260—465)

This invention relates to the preparation of cyano esters. In particular, it relates to a new process for the preparation of cyano esters, such as beta-cyanoacrylates, beta-cyanopropionates and ortho-cyanobenzoates, by the reaction of a chloroformate with a monoamide of a dibasic carboxylic acid, as, for example, maleamic acid, succinamic acid or phthalamic acid and the like. This invention also relates to a new class of organic monomeric materials, the phenyl cis-beta-cyanoacrylates.

Beta-cyanoacrylates have been found useful in the preparation of solid resinous products by copolymerization with vinyl containing compounds, such as, styrene, acrylonitrile, vinyl acetate, vinyl chloride, vinylidene chloride, methyl methacrylate, and the like. Copolymers of beta-cyanoacrylates and styrene, for example, exhibit higher softening points than polystyrene. Heretofore, the preparation of such cyano esters has been by involved and expensive procedures which, at best, have secured low yields of the desired cyano acrylates and most often as isomeric mixtures of the cis and trans forms of the cyano ester.

Beta-cyanopropionates have been found useful in the preparation of the diamides of succinic acids as described by J. Am. Chem. Soc. in vol. 77, page 325 (1955). In addition, certain beta-cyano-propionates have found particular utility as pharmaceutical intermediates as set forth by J. Am. Chem. Soc. in vol. 75, page 2986 (1953), and by J. Chem. Soc., 1956, page 691.

Ortho-cyanobenzoates have been found useful as chemical intermediates as set forth by L. Belley and G. Amiard in Bull. Soc. Chem. France 1946, page 690, and by H. Rupe and F. Bernstein in Helv. Chim. Acta., vol. 13, pages 457 to 473 (1930).

It is one of the objects of the present invention to provide an improved method for the preparation of cyano esters in general, and particularly for the preparation of beta-cyanoacrylates, beta-cyanopropionates and ortho-cyanobenzoates.

It is a further object of this invention to provide a process for the preparation of certain unsaturated cyano esters in predominantly one isomeric form, for example, only the cis or the trans isomer.

These and other objects are accomplished by the present invention, which basically comprises reacting a monoamide of a dibasic carboxylic acid having the formula $$H_2N-C-Y-C-OH$$
$$\;\;\;\;\;\;\;\;\;\; \|\;\;\;\;\;\;\;\;\; \|$$
$$\;\;\;\;\;\;\;\;\;\; O\;\;\;\;\;\;\;\;\; O$$

wherein Y is a substantially inert two carbon chain, with an organic chloroformate in the presence of an acid-accepting tertiary amine and an inert organic solvent for the cyano ester.

The reaction proceeds without need for a catalyst according to the following scheme, being evidenced by the evolution of carbon dioxide:

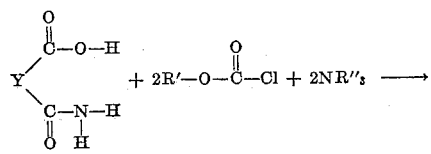
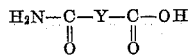 $+ 2R'-O-\overset{O}{\underset{\|}{C}}-Cl + 2NR''_3 \longrightarrow$

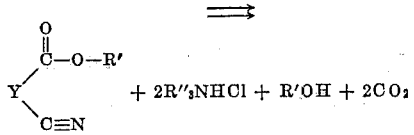

wherein Y is as defined above and R' and R'' are monovalent hydrocarbon radicals, which may contain inert hydrocarbon substituents, such as alkyl, aryl or aralkyl groups, or substituted derivatives thereof, and which may be the same or different.

In the process of the present invention, the monoamide of the dibasic acid should have as the sole reactive groups under the conditions of the reaction, one carboxylic acid group and one amide group, and as indicated, the carboxylic acid group is attached to a carbon atom which is vicinal to the carbon atom to which is attached the amide group. Thus, by the above definition of the group indicated as "Y," the term "substantially inert two carbon chain" is meant to include all groups or radicals forming two bonded carbon atoms in which each of the other valences of the said carbon atoms is satisfied with a substantially inert radical and in which the connecting bonds between the two carbon atoms can be single or multiple bonds; and said carbon atoms may also be part of an aliphatic or aromatic ring. For example, Y can be

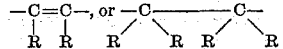

or

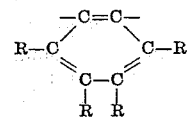

or

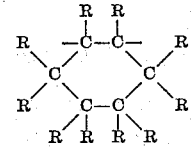

and the like. The chemical constituency of such R groups is not critically important in this invention as long as the radicals are substantially inert, i.e., non-reactive under the conditions of the reaction. For example, R can be hydrogen, halogen, nitro, hydrocarbon, such as alkyl, aryl, cycloalkyl, cycloalkenyl, alkenyl, alkadienyl, cycloalkadienyl and the like, cyano, isocyano, an oxyhydrocarbon, such as alkoxy, aryloxy, carboalkoxy, carboaryloxy, alkylene dioxy and the like, without significantly affecting the course of the reaction. Highly reactive groups, such as carboxyl, amine, imine, hydroxyl, sulfhydryl, and acyl halide, should be avoided as they tend to interfere with the principal reaction and can significantly affect the yield and purity of the cyano ester recovered.

Among the monoamides of dibasic carboxylic acids preferred for use in the process of the invention are maleamic acid, succinamic acid, phthalamic acid, pyromellitamic acid, citraconamic acid, diphenylsuccinamic acid, methoxy phthalamic acid, substituted derivatives thereof, and other like acids which contain a maximum of 16 carbon atoms. The above compounds are listed for illustrative purposes only and are not intended to be limiting of the present invention.

It is not critical in this process that the chloroformate reactant be employed always as such, for it can be formed in situ in the process by the reaction of phosgene and the appropriate hydroxy compound R'OH, which can be, for example, an alcohol or a phenol, as exemplified by the following reaction schematic:

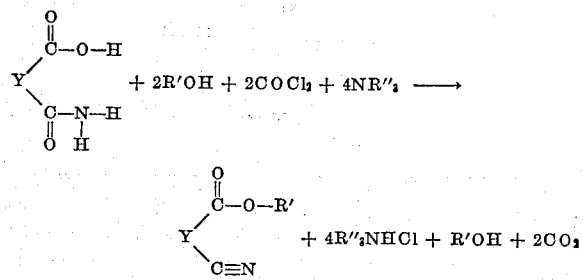

Thus, by the term "chloroformate," we mean to include the chloroformates per se and those formed in situ in the reaction mass, prior to or during the principal reaction from appropriate reactants, and mixtures of chloroformates if desired.

It has been determined that the chloroformate is critical in this process and that it is formed in situ in the reaction scheme set forth above from phosgene and the hydroxy compound. If only the hydroxy compound is present in the reaction, only esterification of the acid group results but with no nitrile formation. Likewise, the acid-accepting tertiary amine is necessary to accept the hydrogen chloride formed in the chloroformate formation as well as in the cyano ester formation from the chloroformate and the monoamide of the dibasic acid.

In the in situ formation of the chloroformate, it is preferred to employ equimolar amounts of phosgene and the hydroxy compound for best yield; however, as is evident from the reaction scheme, such is not necessary because of the generation or regeneration of the hydroxy compound which could be utilized in the reaction.

The organic chloroformates suitable for use in the present process have the formula:

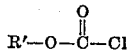

wherein R' is a monovalent hydrocarbon radical having a maximum of 10 carbon atoms, for example, an alkyl radical, such as methyl, ethyl, propyl, isopropyl, butyl, amyl, octyl, decyl and the like; an aryl radical, such as phenyl, benzyl, tolyl and the like; a cycloalkyl radical, such as cyclopropyl, cyclohexyl and the like; a cycloalkenyl radical, such as cyclobutenyl, cyclohexenyl and the like; an alkenyl radical, such as vinyl, butenyl, hexenyl and the like, an alkadienyl radical, a cycloalkadienyl radical and the like. These radicals may in addition bear inert non-hydrocarbon substituents, such as nitro and alkoxy. The present invention is particularly applicable to the production of alkyl and aryl cyano esters from the corresponding alkyl and aryl chloroformates.

The amount of chloroformate employed in the reaction is not narrowly critical. However, for the best yields, it is preferable to employ stoichiometric amounts of the chloroformate and the acid, i.e., two mols of chloroformate for each mol of acid. It is also preferable that the molar quantity of amine correspond to that of the chloroformate or be twice the molar quantity of phosgene if the chloroformate is generated in situ in order to completely accept and neutralize the hydrogen chloride liberated in the reaction.

The tertiary amine serving to accept the liberated hydrogen chloride is preferably a trialkyl amine, although triaryl amines, such as triphenyl amine and trinaphthyl amine, mixed alkyl and aryl substituted tertiary amines, such as dimethylaniline and the like, and heterocyclic amines, such as pyridine, quinoline and the like, are also suitable. In general, any tertiary amine which will accept and substantially neutralize the hydrogen chloride liberated in the reaction and form the amine hydrochloride can be utilized. The lower alkyl tertiary amines are particularly preferred, i.e., those in which the alkyl groups contain from 1 to 6 carbon atoms. Examples of such particularly preferred amines are trimethylamine, triethylamine, tripropylamine, triisopropyl amine and tributyl amine.

In general, the reaction may be carried out at any temperature sufficient to cause the evolution of carbon dioxide but below that temperature at which degradation or polymerization of the reactants or products occurs, preferably within the range of −70° C. to 150° C. Preferably, the reaction is best conducted at or below the boiling point of the solvent employed. When employing chloroformates such as methyl, ethyl or phenyl chloroformate, or in the in situ preparation of chloroformates from phosgene and the hydroxy compound, it is satisfactory to employ low temperatures, such as from around 0° C. to 25° C. For convenient control over the reaction, the chloroformate is desirably added slowly to the monoamide of the dibasic carboxylic acid, or vice versa.

The solvent used should be inert to the reactants and products, substantially dissolve the cyano ester formed in the reaction, and preferably be low boiling for ease of removal. Examples of highly suitable solvents are dichloromethane, chloroform, ethylene dichloride, methylene chloride, benzene and ether, although the use of other solvents for cyano esters will be obvious to those skilled in the art. The amount of solvent is not critical. Solid concentrations from about 10–15 percent by weight have been found most satisfactory to provide the necessary liquid reaction media.

One of the most unusual and surprising features of the present invention is the stereospecificity of the reaction with certain of the reactants. This surprising feature enables some of these products to be recovered solely in either the cis or the trans forms, substantially free of the other isomeric component. For example, when preparing beta-cyanoacrylates from a maleamic acid, if stoichiometric amounts of amine are employed initially in relation to the chloroformate or phosgene, the beta-cyanoacrylate is produced in substantially the cis form. On the other hand, if less than stoichiometric amounts of amine are employed initially in relation to the chloroformate or phosgene, so as to form a beta-cyano acrylate-hydrogen chloride addition product first, and then additional amine is added to the addition product to remove hydrogen chloride therefrom, the product is mainly trans-beta-cyanoacrylate. Other evidence of this stereospecificity is seen in the examples.

According to one preferred form of the process of this invention, the monoamide of the dibasic carboxylic acid is slurried into 10 to 12 times its weight of the solvent, such as dichloromethane, to which is added two mols of the tertiary amine per mol of the acid or, if the chloroformate is to be formed in situ, four mols of the tertiary amine per mol of the acid. The reaction mixture is stirred and cooled to a temperature of from about 0° C. to 5° C. Then, two mols of the chloroformate or two mols each of phosgene and the hydroxy compound per mol of the acid are added slowly, while the carbon dioxide evolves from the mixture and the temperature is maintained at about 0° C. to 5° C. When the addition is complete, the temperature is allowed to rise to room temperature and stirring is continued until the reaction is complete, as judged by no further evolution of carbon dioxide, generally from one to sixteen hours. The reaction mixture can be either filtered or washed with water to remove precipitated amine hydrochloride and the filtrate or dichloromethane solution of product subjected to distillation to remove the dichloromethane. The residue can then be fractionated under reduced pressure or recrystallized from an inert solvent to yield the desired cyano ester. When a substituted or unsubstituted maleamic acid is reacted with the organic chloroformate according to this embodiment of the invention, the beta-cyanoacrylate is produced in substantially exclusively the cis-form.

According to another preferred form of the process, the chloroformate or phosgene and the hydroxy compound are mixed in about 5 to 15 times their weight of a solvent, such as dichloromethane, at a temperature below about 5° C. A solution of the amine and the acid is then added thereto. Preferably, two mols each of phosgene, the hydroxy compound and the amine are employed per mol of the acid. The mixture is stirred during the addition and stirring is continued until the reaction is complete, as judged by no further evolution of carbon dioxide. The product, which is a cyano ester-hydrogen chloride addition product, is isolated as discussed above and treated at room temperature with one mol of amine in ether per mol of product to remove the hydrogen chloride. The ether solution can be filtered to remove the amine hydrochloride and the filtrate distilled to remove the ether. The residue can be fractionated under reduced pressure to yield the desired cyano ester. When a substituted or unsubstituted maleamic acid is reacted with phosgene and the hydroxy compound according to this embodiment, the beta-cyanoacrylate produced is mainly the trans isomer.

As another feature of the present invention, a new class of compounds has been prepared, which is represented by the formula:

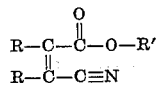

wherein the R groups are substantially inert radicals and R' is a phenyl radical, and particularly the lowest member of the class, phenyl cis-beta-cyanoacrylate. The compounds of this class are useful in the preparation of solid thermoplastic products by copolymerization with vinyl containing compounds, such as styrene, acrylonitrile, vinyl acetate, vinyl chloride, vinylidene chloride, methyl methacrylate, and the like. Copolymers of phenyl cis-beta-cyanoacrylate and styrene, for example, exhibit higher softening points than polystyrene and can be injection molded.

The present invention is further illustrated by the following examples.

EXAMPLE I

*Preparation of Ethyl Cis-Beta Cyano Acrylate*

To 29 g. (¼ mol) of maleamic acid in 500 ml. of dichloromethane were added 52 g. (½ mol) of triethyl amine. The reaction mixture was stirred and cooled in an ice bath to a temperature of from 0° C. to 5° C. Then, 54 g. (½ mol) of ethyl chloroformate were added dropwise over a period of about 20 minutes. The mixture was then stirred for an additional 16 hours at room temperature, 30° C. It was filtered to remove triethyl amine hydrochloride and the filtrate was distilled at atmospheric pressure to remove the solvent. The residue was distilled at reduced pressure (0.2 mm.) and the fraction, amounting to 31 grams, boiling between 50 and 54° C., was collected. It was a colorless liquid having a refractive index of $n_D^{25}$ 1.4491. The absorption in its infrared spectrum at 4.5 m$\mu$ was weak, indicating presence of —C≡N group; at 5.8 m$\mu$ it was strong, indicating presence of —COOEt; and at 6.2 m$\mu$ it was medium, indicating presence of >C=C< group. Vapor phase chromatography in a silicone column at 190° C. indicated that there was no detectible trans-isomer present and that the once distilled product was 91.4% pure cis-beta-cyanoacrylate.

EXAMPLE II

*Preparation of Methyl Cis-Beta-Cyano Acrylate*

To 19 g. (0.165 mol) of maleamic acid slurried in 200 ml. of dichloromethane were added 34 g. (0.333 mol) of triethyl amine. The reaction mixture was stirred and cooled to a temperature of from 0° C. to 5° C. Then 34 g. (0.35 mol) of methyl chloroformate were added dropwise over 20 minutes. The mixture was stirred an additional 16 hours and filtered to remove triethylamine hydrochloride. The crude product crystallized to a mush, which was distilled under reduced pressure (90 mm.). After a small forerun, the fraction boiling between 139° C. and 143° C. was collected. The yield was 8 g. or 43% of a liquid which partially solidified. This material was further purified by chromatography on a magnesium aluminum silicate column prepared with pentane, the methyl cis-beta-cyanoacrylate being eluted with benzene. Both the once distilled and the chromatographed material showed only one peak in the vapor phase chromatograph from a carbowax column, indicating a substantially pure product with no detectable contaminants. No trans-isomer was detectable.

Microanalysis of the product further substantiated the assigned structure.

Calc. for $C_5H_5O_2N$: C, 54.05%; H, 4.54%; N, 12.61%. Found: C, 53.92%, C, 53.94%; H, 4.28%, H, 4.43%; N, 12.65%, N, 12.58%.

For comparative purposes, methyl trans-beta-cyanoacrylate was prepared according to the method described in U.S. Patent No. 2,293,969, issued on August 25, 1942, to Crawford et al. The retention time from the vapor phase chromatogram of methyl cis-beta-cyanoacrylate prepared in Example II differed from that of the trans-isomer. Also, the infrared spectra of the cis- and trans-isomers were significantly different and a mixture melting point of the two isomers was depressed. The nuclear magnetic resonance spectra of the cis- and trans-isomers additionally substantiated the assigned structure.

EXAMPLE III

*Preparation of Phenyl Cis-Beta-Cyano Acrylate*

Maleamic acid (23 g., 0.2 mol) was slurried in 200 ml. of dichloromethane and this mixture was cooled in an ice bath to a temperature of from 0° C. to 5° C., while 40.4 g. (0.4 mol) of triethylamine were added. The mixture was further cooled by the ice bath and 62.6 g. (0.4 mol) of phenylchloroformate were added dropwise over one hour. A gas was evolved during this time and the mixture was stirred for 24 hours during which time it slowly came to room temperature. The triethylamine hydrochloride and dichloromethane were removed as described in Example I. The residue was dissolved in benzene and washed twice with cold 10% sodium hydroxide solution, then with water. The benzene was removed under reduced pressure and the residue distilled. Twenty-two grams (64%) of product having a boiling point of 95–100° C. (0.2 mm.) were collected. This material crystallized and had a melting point of 42–45° C. The infrared spectrum was consistent with the assigned structure, phenyl cis-beta-cyanocrylate, and indicated that there was no detectible trans-isomer present.

EXAMPLE IV

*The Preparation of Ethyl β-Cyanopropionate*

Succinamic acid (prepared from succinic anhydride and aqueous ammonia) (20 g., 0.17 mol) was slurried in 200 ml. of dichloromethane and cooled to 0–5° C. Then triethyl amine (34 g., 0.34 mol) was added all at once and the reaction mixture was recooled to 0–5° C. Ethyl chloroformate (37 g., 0.34 mol) was then added through a dropping funnel at a rate to maintain the temperature below 15° C. After the addition, the reaction mixture was allowed to stand for two days during which time it came to room temperature. The triethyl amine hydrochloride was removed by filtration and washing with water. The organic solution thus obtained was stripped of solvent at the water pump and distilled under high vacuum. A total of 14.9 grams of a liquid, having a boiling point of 54.3–55.5° C. (0.35 mm.) and an index refraction of $n_D25$ 1.4228–1.4222, was obtained. The material had an infrared spectrum which contained bands at 4.43 mu (—C≡N) and 5.77 mu (—COOC$_2$H$_5$), confirming the structure assigned, ethyl β-cyanopropionate. The physical constants were in agreement with those published for this material. The total yield was 70%.

The assigned structure was further substantiated by microanalysis.

Calc. for C$_6$H$_9$O$_2$N: C, 56.68%; H, 7.14%; N, 11.02%. Found: C, 56.63%, C, 56.90%; H, 7.03%, H, 6.95%; N, 9.88%, N, 10.18%.

EXAMPLE V

The Preparation of a Mixture of o-Dicyanophthalates

To a mixture of the isomeric pyromellitamic acids (3.1 g.) in methylene chloride (100 ml.) were added two equivalents each of triethylamine and ethyl chloroformate in that order. The mixture was stirred and allowed to stand overnight. The triethylamine hydrochloride was removed by filtration, and the residue obtained by evaporation of the filtrate was recrystallized from ethanol. The material, a white crystalline solid, had a melting point of 150–170° C. and had nitrile and carboethoxyl bands in the infrared spectrum indicating that it was a mixture of the diethyl di-o-cyano phthalates.

EXAMPLE VI

The Preparation of Ethyl o-Cyanobenzoate

Ten grams of phthalamic acid were slurried in 150 ml. of dichloromethane and cooled to 0–5° C. Triethylamine, 13.54 g., was added all at once and the mixture was recooled to 0–5° C. Then ethyl chloroformate was added dropwise while the temperature was held below 5° C. After the addition, the mixture was stirred three hours during which time the mixture came to room temperature. Triethylamine hydrochloride was removed by filtration and the filtrate was stripped of solvent. The residue was dissolved in ether and filtered to remove the rest of the amine salt. Then the ether solution was dried with magnesium sulfate and the ether removed at the water pump. The crude ethyl o-cyanobenzoate (12.3 g.) was recrystallized from benzene-pentane to yield 9 g. of white crystals, having a melting point of 62–65° C. The infrared spectrum and melting point are correct for the assigned structural formula.

Microanalysis of the material provided further evidence for the assigned structure.

Calc. for C$_{10}$H$_9$O$_2$N: C, 68.56%; H, 5.18%; N, 8.00%. Found: C, 68.72%; H, 5.43%; N, 7.92%.

EXAMPLE VII

Preparation of Ethyl Cis-β-Cyanoacrylate Using Phosgene and Ethanol

A solution of phosgene (114 g., 1.15 mol) was prepared at about 0–5° C. in 600 ml. dichloromethane. Ethanol, 54 g., was added dropwise. Maleamic acid (57 g.) dissolved in 140 ml. triethylamine and 140 ml. dichloromethane was added to this solution dropwise with stirring. The reaction was cooled by an ice-salt bath during this addition. Then 140 ml. of triethylamine were added dropwise. During the additions, vigorous evolution of CO$_2$ was noted. The reaction was stirred at room temperature overnight. Then 100 g. of sodium hydroxide in 1 liter saturated NaCl solution (ice-cold solution) was added rapidly and the mixture was stirred for ½ hour. The organic layer was separated, and the solvent and triethylamine were separately collected by distillation at room temperature. Most of the triethylamine is recovered for further use by this method. The residual oil was distilled, yielding 36 g. of a product having a boiling point of 54–62° C. The infrared spectra indicated ethyl cis-β-cyanoacrylate containing some of the trans-isomer.

EXAMPLE VIII

Preparation of Ethyl β-Cyanoacrylate Using Phosgene and Ethanol

Maleamic acid (57 g., 0.5 mol) and triethylamine (202 g., 2 mols) with 46 g. of ethanol were dissolved in dichloromethane. An excess of phosgene was bubbled in for three hours; the mixture then stood for two days. Triethylamine hydrochloride was removed by filtration and the filtrate washed with water. The solvent was removed by distillation at the water pump and the residue distilled. The total yield was 40 grams collected in four fractions. Gas chromatographic analysis and a qualitative test for halogen indicated that chlorinated products in addition to the desired ethyl β-cyanoacrylate had been obtained. The fractions were recombined and treated with 100 ml. of 20% triethylamine in ether; the triethylamine hydrochloride was removed by filtration after one hour and the product separated from the ether by distillation. About 25 grams (40%) of a mixture of trans and cis ethyl β-cyanoacrylates was obtained. The trans compound was present in a larger amount as shown by comparison of the infrared spectra of the distillation fractions with spectra of authentic samples of the cis- and trans-isomers.

A sample of the fraction showing the most trans-isomer in the infrared spectra was redistilled for microanalysis. The values obtained substantiate the assigned molecular formula.

Calc. for C$_6$H$_7$O$_2$N: C, 57.60%; H, 5.64%; N, 11.20%. Found: C, 57.57%, C, 57.27%; H, 5.76%, H, 5.50%; N, 11.23%, N, 11.26%.

What is claimed is:

1. A process for the preparation of a cyano ester which has the formula:

$$NC-Y-COOR'$$

wherein Y and R' are as subsequently defined, which comprises, admixing at a temperature of about −70° C. to about 150° C., a monoamide of a dibasic carboxylic acid containing as the sole reactive groups under the conditions of the reaction one amide group and one carboxylic acid group and having the formula:

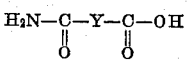

wherein Y is a hydrocarbon chain containing a maximum of 14 carbon atoms and the —CONH$_2$ and —COOH groups are attached to vicinal carbon atoms in said hydrocarbon chain, with an organic chloroformate having the formula:

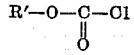

wherein R' is a monovalent hydrocarbon radical containing a maximum of 10 carbon atoms, in contact with a tertiary amine, whereby said monoamide and said chloroformate react to form said cyano ester.

2. A process as defined in claim 1 wherein said admixing is conducted at a temperature of about 0° C. to about 25° C.

3. A process as defined in claim 1 wherein said monoamide of a dibasic carboxylic acid has the formula:

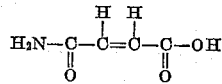

4. A process as defined in claim 1 wherein said organic chloroformate is phenyl chloroformate.

5. A process as defined in claim 1 wherein said organic chloroformate is ethyl chloroformate.

6. A process as defined in claim 1 wherein said tertiary amine is triethylamine.

7. A process for the preparation of a cyano ester which has the formula:

$$NC-Y-COOR'$$

wherein Y and R' are as subsequently defined, which comprises, admixing at a temperature of about −70° C. to about 150° C., a monoamide of a dibasic carboxylic acid containing as the sole reactive groups under the conditions of the reaction one amide group and one carboxylic acid group and having the formula:

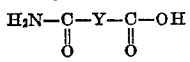

wherein Y is a hydrocarbon chain containing a maximum of 14 carbon atoms and the —CONH$_2$ and —COOH groups are attached to vicinal carbon atoms in said hydrocarbon chain, with about a stoichiometric amount of an organic chloroformate having the formula:

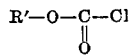

wherein R' is a monovalent hydrocarbon radical containing a maximum of 10 carbon atoms, in contact with an amount of a tertiary amine which is sufficient to neutralize substantially all of the hydrogen chloride liberated in the reaction between said monoamide and said chloroformate, whereby said monoamide and said chloroformate react to form said cyano ester.

8. A process for the preparation of a cyano ester which has the formula:

NC—Y—COOR' wherein Y is a hydrocarbon chain containing a maximum of 10 carbon atoms and the —CN and —COOR' groups are attached to vicinal carbon atoms in said hydrocarbon chain, and wherein R' is as subsequently defined, which comprises, admixing at a temperature of about —70° C. to about 150° C., a monoamide of a dibasic acid selected from the group cnosisting of maleamic acid, succinamic acid, pyromellitamic acid and phthalamic acid, with about a stoichiometric amount of an organic chloroformate having the formula:

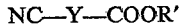

wherein R' is a monovalent hydrocarbon radical selected from the group consisting of alkyl containing a maximum of 10 carbon atoms and aryl containing a maximum of 7 carbon atoms, in contact with about a stoichiometric amount of trialkyl amine, said alkyl groups of said trialkyl amine each containing 1 to 6 carbon atoms, whereby said monoamide and said chloroformate react to form said cyano ester.

9. A process for the preparation of a cyano ester which has the formula:

NC—Y—COOR' wherein Y and R' are as subsequently defined, which comprises, admixing at a temperature of about —70° C. to about 150° C., a monoamide of a dibasic carboxylic acid containing as the sole reactive groups under the conditions of the reaction one amide group and one carboxylic acid group and having the formula:

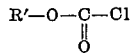

wherein Y is a hydrocarbon chain containing a maximum of 14 carbon atoms and the —CONH$_2$ and —COOH groups are attached to vicinal carbon atoms in said hydrocarbon chain, with about a stoichiometric amount of an organic chloroformate having the formula:

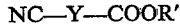

wherein R' is a monovalent hydrocarbon radical selected from the group consisting of alkyl containing a maximum of 10 carbon atoms and aryl containing a maximum of 7 carbon atoms, in contact with about a stoichiometric amount of trialkyl amine, said alkyl groups of said trialkyl amine each containing 1 to 6 carbon atoms, whereby said monoamide and said chloroformate react to form said cyano ester.

10. A process for the preparation of a cyano ester which has the formula:

NC—Y—COOR' wherein Y is as subsequently defined and R' is a monovalent hydrocarbon radical containing a maximum of 10 carbon atoms, which comprises admixing at a temperature of about —70° to about 150° C., a monoamide of a dibasic carboxylic acid containing as the sole reactive groups under the conditions of the reaction one amide group and one carboxylic acid group and having the formula:

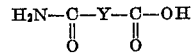

wherein Y is a hydrocarbon chain containing a maximum of 14 carbon atoms and the —CONH$_2$ and —COOH groups are attached to vicinal carbon atoms in said hydrocarbon chain, with about 2 moles of phosgene, per mole of said monoamide, and with about 2 moles of a hydroxy compound selected from the group consisting of alcohols and phenols, per mole of said monoamide, in contact with an amount of a tertiary amine which is sufficient to neutralize substantially all of the hydrogen chloride liberated in the reaction mixture, and recovering the said cyano ester formed.

References Cited in the file of this patent

UNITED STATES PATENTS

| 2,205,076 | Wortz | June 18, 1940 |
| 2,206,351 | Greenhalgh | July 2, 1940 |
| 2,269,105 | Hentrich et al. | Jan. 6, 1942 |
| 2,293,969 | Crawford et al. | Aug. 25, 1942 |
| 2,297,811 | Stocker | Oct. 6, 1942 |
| 2,439,081 | Dickey et al. | Apr. 6, 1948 |
| 2,794,788 | Coover et al. | June 4, 1957 |

OTHER REFERENCES

Bergmann: "The Chemistry of Acetylene and Related Compounds," 1948, p. 80.

Conant and Blatt: "The Chemistry of Organic Compounds," 4th edition, 1952, p. 139.